United States Patent [19]

Bloxsom

[11] 4,305,383
[45] Dec. 15, 1981

[54] SOLAR ENERGY COLLECTOR

[76] Inventor: Dan E. Bloxsom, P.O. Box 36116, Houston, Tex. 77042

[21] Appl. No.: 956,220

[22] Filed: Oct. 30, 1978

[51] Int. Cl.$^3$ .............................. F24J 3/02; G02B 1/06
[52] U.S. Cl. ..................................... 126/440; 350/416
[58] Field of Search ................. 350/175 R, 179, 198; 126/440, 432, 438

[56] References Cited

U.S. PATENT DOCUMENTS

| | | | |
|---|---|---|---|
| 389,125 | 9/1888 | Weston | 126/271 |
| 842,788 | 1/1907 | Huntoon | 126/440 |
| 1,460,501 | 6/1923 | Ritter | 350/179 |
| 1,658,455 | 2/1928 | Metzech | 126/440 |
| 2,165,078 | 7/1939 | Toulon | 350/179 |
| 3,182,654 | 5/1965 | Culling | 126/271 |
| 3,203,167 | 8/1965 | Green | 126/271 |
| 3,493,291 | 2/1970 | Webb | 126/271 |
| 3,587,559 | 6/1971 | Nonaka | 126/271 |
| 3,860,811 | 1/1975 | Slauter | 350/179 |
| 3,934,573 | 1/1976 | Dandini | 126/271 |
| 4,098,263 | 7/1978 | Lanciault | 126/440 |
| 4,134,393 | 1/1979 | Stark | 126/440 |

FOREIGN PATENT DOCUMENTS

572195 1/1976 Switzerland .................... 126/440

OTHER PUBLICATIONS

NASA Technical Memorandum, NASA TM X-7333, L. Hastings, S. Allum, R. Cosby, Aug. 1976.
NASA Technical Brief, Frensel-Lens Solar-Energy Collectors, S. Allums, R. Crosby, L. Hastings, Spring 1977.
Popular Science, Oct. 1976, Concentrating Collectors, C. P. Gilmore.

*Primary Examiner*—Samuel Scott
*Assistant Examiner*—G. Anderson
*Attorney, Agent, or Firm*—Murray Robinson; Russell D. Weaver; William E. Shull

[57] ABSTRACT

A solar energy collector having an energy concentrating unit and an energy collecting unit is disclosed. The concentrating unit includes at least one converging lens for concentrating the sun's rays onto the collecting unit. Each lens may be blow-formed from sheets of thermoplastic. Each lens may be hollow or filled with a liquid.

The collecting unit includes a fluid-transporting member having a heat transfer fluid therein. Input and output pipes connected to the fluid-transporting member carry the heat transfer fluid to and from the fluid-transporting member, respectively. The fluid-transporting member may be a coil, or it may be a double-walled dome, or an arch of flat hollow plates.

The solar energy collector further includes a backplate for fixing the position of the collecting unit relative to the concentrating unit such that the focus of each lens is on or near the fluid-transporting member. The backplate may have translucent portions for allowing a portion of the sun's rays to pass through the solar energy collector.

8 Claims, 9 Drawing Figures

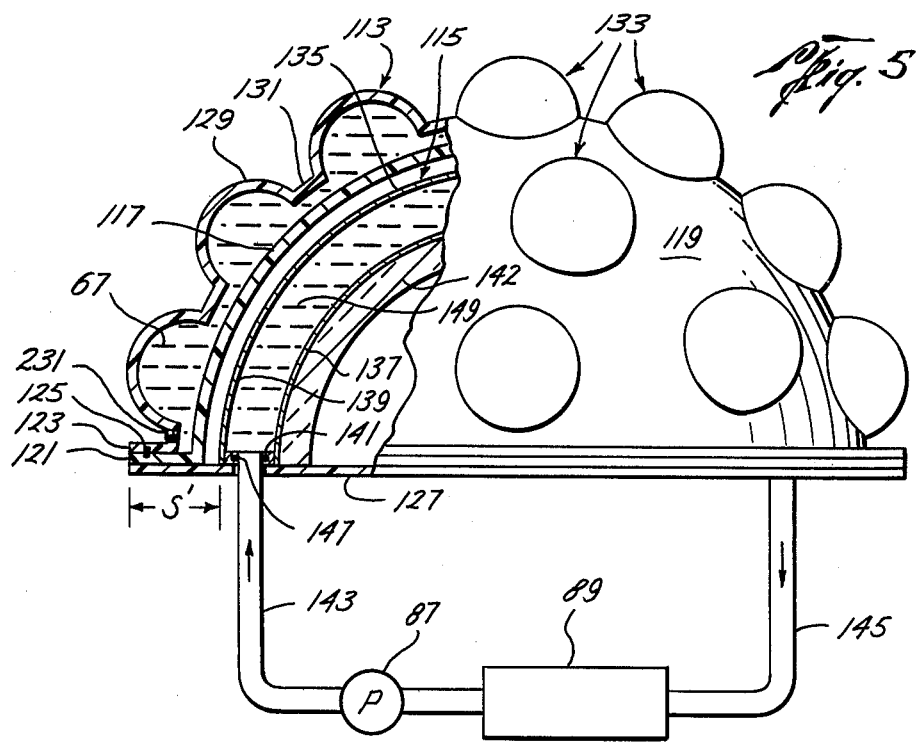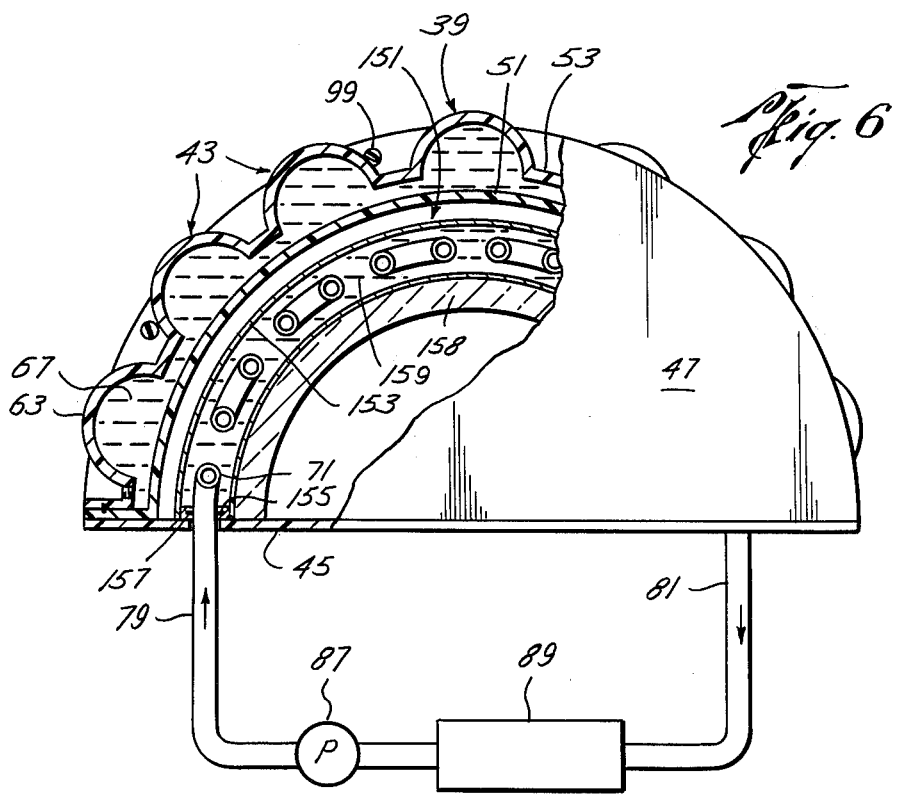

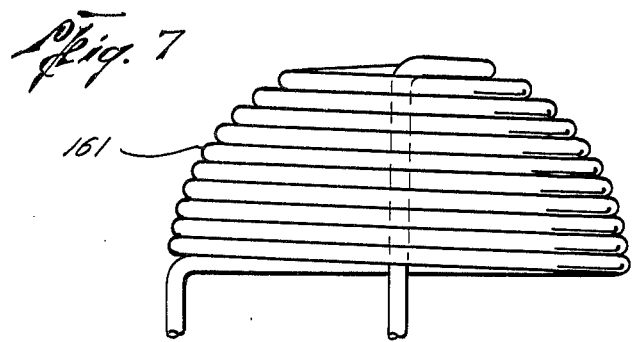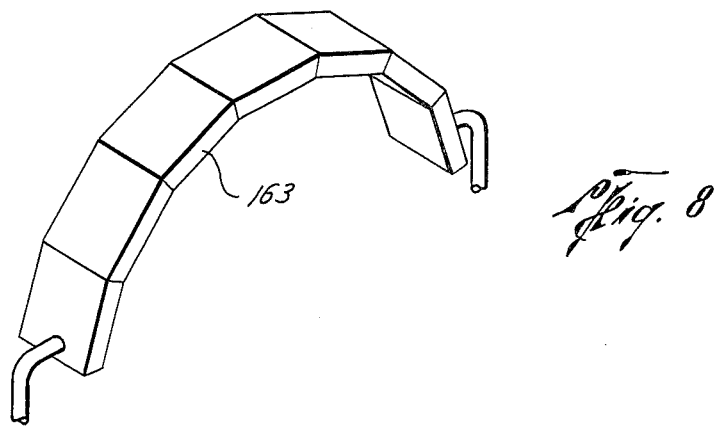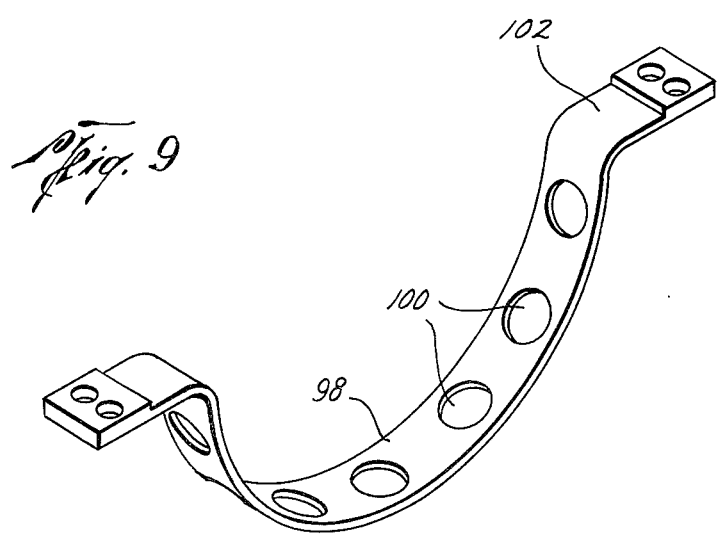

SOLAR ENERGY COLLECTOR

BACKGROUND OF THE INVENTION

1. Field of the Invention

The present invention relates generally to systems for collecting electromagnetic energy, and more particularly to a system for concentrating the sun's rays onto an energy collecting unit.

2. Description of the Prior Art

The prior art includes numerous systems for collecting and utilizing solar radiant energy. In such systems, the solar energy is typically used to heat a fluid, either liquid or gas. Water and air are widely used. The heated fluid is then conveyed, generally by means of pumps, to a remote location where it is stored in an insulated chamber for subsequent utilization.

Systems for utilizing solar energy have included, for example, systems for heating and/or cooling rooms or buildings and the like. See, e.g., U.S. Pat. Nos. 4,030,312, issued to Wallin et al on June 21, 1977; 4,028,904, issued to Anderson on June 14, 1977; 4,028,078, issued to Peckham on June 7, 1977; 4,018,581, issued to Ruff et al on Apr. 19, 1977; 4,007,776, issued to Alkasab on Feb. 15, 1977; 3,242,679, issued to Puckett et al on Mar. 29, 1966; 2,713,252, issued to Jackson et al on July 19, 1955; 2,529,154, issued to Hammond et al on Nov. 7, 1950; 2,342,211, issued to Newton on Feb. 22, 1944; German Pat. No. 473,729, issued Mar. 7, 1929. Other systems for utilizing solar energy have been proposed. See, e.g., 817 O.G. 1680, Aug. 31, 1965 re "Means and Method of Utilizing Solar Energy."

Prior art solar energy systems have included both reflective and refractive means for concentrating and directing the sun's rays. Such refractive means have included converging lenses for focusing the sun's rays on various devices. See, e.g., U.S. Pat. No. 389,125, issued to Weston on Sept. 4, 1888; 887 O.G. 1513, June 28, 1971 re "Water-Heating Apparatus Utilizing Solar Rays"; 814 O.G. 469-470, May 11, 1965 re "Solar Energy Heating Apparatus". A plurality of such lenses have been disposed on a spherical shell for concentrating solar energy onto a boiler inside of and concentric with the shell. See U.S. Pat. No. 3,934,573, issued to Dandini on Jan. 27, 1976. A plurality of such lenses have also been combined into a compound lens. See, e.g., 871 O.G. 182, Feb. 3, 1970 re "High Temperature Lens Construction". The lenses used for such purposes, however, have typically been manufactured by fine grinding and polishing and, as a result, are fairly costly, especially when the lenses are large.

Concentrating lenses of the prior art have sometimes been filled with a liquid. The Roman philosopher Seneca (3 B.C.–65 A.D.) pointed out that a glass globe filled with water could be used for magnifying purposes. E. Hecht and A. Zajac, Optics, at 1 (Addison-Wesley, 1976). Also, concentrating lenses in a fluid-filled spheroid are found in nature, though the lenses themselves may not be fluid-filled. For example, the human eye includes a biconvex lens on either side of which is disposed a transparent fluid, i.e., the aqueous humor on one side, and the vitreous humor on the other.

Of late, however, systems for collecting and utilizing solar radiant energy have generally included reflective means for concentrating and directing the sun's rays. Extensive research has been directed toward designing reflectors that direct the sun's rays onto a fluid-carrying conduit. See, e.g., U.S. Pat. Nos. 3,923,039, issued to Falbel on Dec. 2, 1975; 3,923,381, issued to Winston on Dec. 2, 1975; 3,951,128, issued to Schoenfelder on Apr. 20, 1976; 3,964,464, issued to Hockman on June 22, 1976; 3,974,824, issued to Smith on Aug. 17, 1976; 3,982,527, issued to Cheng et al on Sept. 28, 1976; 3,985,116, issued to Kapany on Oct. 12, 1976; 3,990,430, issued to Robertson on Nov. 9, 1976; 3,991,740, issued to Rabl on Nov. 16, 1976; 4,003,638, issued to Winston on Jan. 18, 1977; 4,011,855, issued to Eshelman on Mar. 15, 1977; and 4,007,729, issued to Chao et al on Feb. 15, 1977. One of the principal objectives of these designs is to provide a collector that will direct the sun's rays onto the conduit regardless of the position of the sun in the sky. The reflectors of these designs are generally costly because they involve fairly complex geometrical configurations.

Other research has been directed to mechanisms known as heliostats that move the reflectors to track the sun's path. See, e.g., U.S. Pat. Nos. 3,884,217, issued to Wartes on May 20, 1975; 3,994,279, issued to Burak on Nov. 30, 1976; and 4,011,858, issued to Hurkett on Mar. 15, 1977. These mechanisms are extremely costly and may require repair from time to time.

None of the prior art discloses the use of a plurality of converging lenses to focus the sun's rays onto a fluid-transporting coil, nor onto a fluid-transporting double-walled dome, nor onto an arch of flat hollow plates. Also, none of the prior art teaches that the lenses included in such a plurality of lenses may be filled with a liquid. Further, the prior art does not disclose that a unit carrying such a plurality of lenses may be mounted on a house or other structure to concentrate and collect solar energy while allowing a portion of the sun's rays to pass through the unit into the interior of the house or structure.

SUMMARY OF THE INVENTION

The present invention is a system for collecting solar radiant energy that is very simple and inexpensive to manufacture. The system includes no moving parts, resulting not only in ease and low cost of manufacture, but also in minimal repair and maintenance. The system is designed to collect the sun's rays regardless of the position of the sun in the sky and regardless of the season. The system may be readily installed on a house or other structure. No substantial adjustment is necessary either at the time of installation or during use. The system will concentrate and collect solar radiant energy while allowing a portion of the sun's rays to pass through into the interior of the house or structure.

The system includes a concentrating unit and a collecting unit. The concentrating unit includes at least one converging lens for concentrating the sun's rays onto the collecting unit. Each lens may be blow-formed from sheets of thermoplastic. Each lens may be hollow or filled with a liquid.

The collecting unit includes a fluid-transporting member having a heat transfer fluid therein. Input and output pipes connected to the fluid-transporting member carry the heat transfer fluid to and from the fluid-transporting member, respectively. The fluid-transporting member may be a coil, or it may be a double-walled dome, or an arch of flat hollow plates.

The collector further includes a backplate for fixing the position of the collecting unit relative to the concentrating unit such that the focus of each lens is on or near the fluid-transporting member. The backplate may have translucent portions for allowing a portion of the sun's rays to pass through the collector.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein:

FIG. 5 is an elevation, partly in section and with some parts broken away, of an alternative embodiment of the solar energy collector of the invention;

FIG. 6 is an elevation, partly in section and with some parts broken away, of another alternative embodiment of the solar energy collector of the invention;

FIG. 7 is a pictorial view of an alternative collecting unit of the embodiment shown in FIG. 5;

FIG. 8 is a pictorial view of an alternative collecting unit of the embodiment of FIG. 3; and FIG. 9 is a pictorial view of a mold used to form the lenses of the collecting unit of the preferred embodiment of the invention.

DETAILED DESCRIPTION OF THE PREFERRED EMBODIMENT OF THE INVENTION

Figure 1:
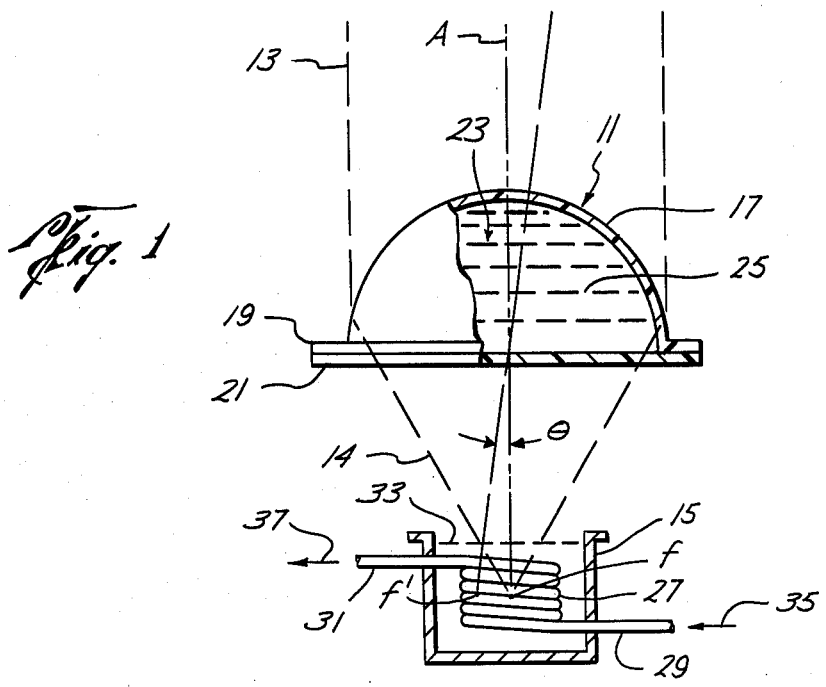
FIG. 1 is an elevation, partly in section and with some parts broken away, illustrating the use of a liquid-filled lens to heat by solar radiant energy a coil disposed in a liquid-filled cup.

Referring to FIG. 1, converging lens 11 refracts the sun's rays 13 impinging upon the lens 11 and the refracted rays 14 are converged into a cup 15. Lens 11 includes a transparent curved portion 17 that is generally of the shape of a hollow hemisphere with an outwardly extending circumferential flange 19 disposed around its edge. Lens 11 also includes a transparent disk portion 21 of substantially the same diameter as the outer diameter of flange 19. Disk portion 21 is attached to curved portion 17 at flange 19. The chamber 23 between lens portions 17, 21 is filled with a transparent liquid 25.

A helical coil 27 of hollow tubing is disposed in cup 15. The tubing forming coil 27 extends from the bottom and the top of the coil through the walls of the cup 15 to form input tube 29 and output tube 31. Cup 15 contains a heat transfer liquid 33 which fills the cup to a level above the top of coil 27. A heat transfer fluid, the flow of which is indicated by arrows 35, 37, flows through the hollow tubing forming coil 27 and tubes 29, 31. The fluid indicated by 35, 37 may be either a liquid or a gas.

Parallel light rays impinging upon lens 11 will be converged at focal point f of the lens when such parallel rays are also parallel to the optical axis A of the lens. Parallel light rays that impinge upon lens 11 at an angle $\theta$ to its optical axis A will be converged at a point f' to one side of the focal point f in the focal plane of the lens, the location of f' in the focal plane depending upon angle $\theta$. Thus, when the sun is positioned on optical axis A of lens 11, the sun's rays 13 which are generally parallel rays will be refracted generally as at 14 and concentrated proximate focal point f. When the sun is positioned at an angle $\theta$ to optical axis A of lens 11, the sun's rays will be concentrated proximate f'.

The energy of the sun's rays converged by lens 11 into cup 15 may be used to heat coil 27 directly, by focusing the rays on the coil, or indirectly, by focusing the rays in the heat transfer liquid 33 surrounding the coil. In the latter case, the liquid 33 conveys heat energy to the coil 27. The coil 27 when heated directly or indirectly then conveys heat energy to the heat transfer fluid indicated at 35, 37 flowing within the coil. The heated fluid within the coil may then be conveyed through output tube 31 to an intermediate use, or to a storage area for subsequent use.

Figure 3:
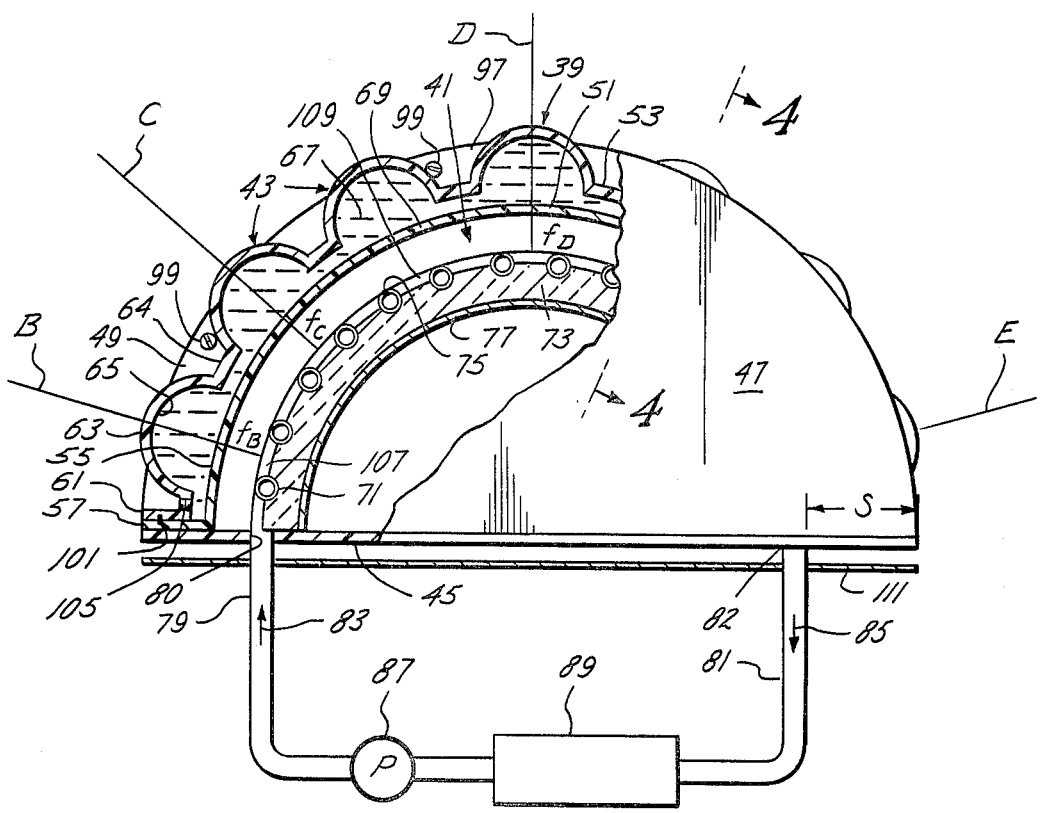
FIG. 3 is an elevation, partly in section and with some parts broken away, of the preferred embodiment of the solar energy collector of the invention.

Referring now to FIG. 3, there is shown a solar energy collector including an energy concentrating unit, indicated generally at 39, and an energy collecting unit, indicated generally at 41. Energy concentrating unit 39 comprises a plurality of converging lenses 43 disposed in a curved, arch-like configuration over and spaced apart from energy collecting unit 41. Unit 39 may, for example, have the shape of a round arch. Collecting unit 41 is likewise disposed in a curved, arch-like configuration, which preferably conforms to the curvature of, or is parallel to, the concentrating unit 39. A backplate 45 and side plates 47, 49 are provided for supporting the concentrating unit 39 and the collecting unit 41 is fixed, preferably parallel uniformly spaced apart relationship with each other.

Concentrating unit 39 includes an inner strip 51 and an outer strip 53 of transparent thermoplastic such as, for example, Lucite acrylic. Inner plastic strip 51 comprises curved central body portion 55 and first outwardly extending flanged portions 57 at both ends of the strip 51. Central body portion 55 is generally semicircular in curvature and has parallel sides, i.e., body portion 55 is generally of the shape of a hollow, right circular semicylinder.

Figure 4:
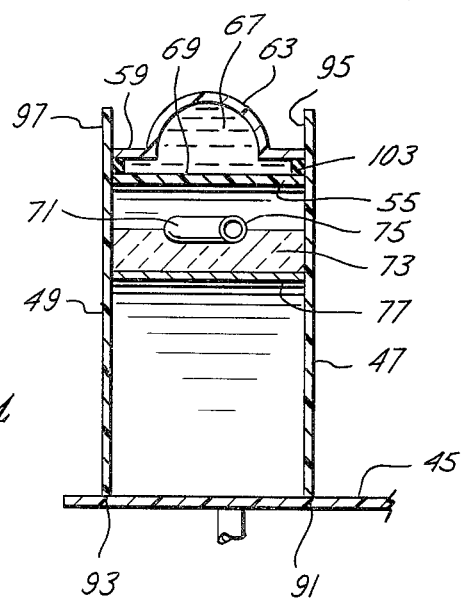
FIG. 4 is a section of the preferred embodiment of the present invention as taken along section lines 4—4 of FIG. 3.

Outer plastic strip 53 comprises curved main body section or portion 59 (FIG. 4), second outwardly extending flanged portions 61 at both ends of the strip 53, and a plurality of spherical bulges or bubbles 63 on main body section or portion 59. Spherical bulges or bubbles 63 form the outer surfaces of converging lenses 43. The area 64 of main body section 59 between and to the sides of bubbles 63 conforms generally to the shape of a hollow, right circular semicylinder in like manner as does central body portion 55 of inner plastic strip 51. The inner 51 and outer 53 strips are parallel, the curved portion 55 of inner strip 51 being nested within and uniformly spaced apart from the curved section 59 of outer strip 53. Flanges 61 of outer strip 53 rest upon flanges 57 of inner strip 51 and are attached thereto, as by cement, thereby supporting outer strip 53 in fixed nesting relationship with inner strip 51.

The space between the inner and outer strips, 51, 53, including the chambers between the inner surfaces 65 of bubbles 63 and the curved portion 55 of inner strip 51, is preferably filled with a transparent liquid 67. A liquid having optical properties similar to those of the plastic used for the strips 51, 53 should be used. Also, liquid 67 should be substantially immune from deterioration when exposed to the sun. Liquid 67 is preferably mineral oil such as, for example, Nujol. There is fluid communication between the liquid-filled chambers under the bubbles 63 through passageways 69 between and to the sides of the bubbles.

Bubbles 63, the corresponding liquid-filled chambers beneath the bubbles and the respective segments of curved strip portion 55 thereunder comprise meniscus-type converging lenses 43 of concentrating unit 39. Although it is preferred to employ liquid-filled lenses, liquid 67 may be eliminated, in which case lenses 43 would be hollow. Lenses 43 are preferably uniformly angularly spaced on unit 39 around its transverse axis or its center of curvature. The number of lenses 43 that may be used depends, of course, upon the size of the lenses and the size of the unit 39. In a solar energy collector of six feet in outside diameter, for example, five to seven lenses of ten to twelve inch diameter may be used.

Collecting unit 41 comprises a serpentine coil 71 of tubing disposed in curved, arch-like configuration under and uniformly spaced apart from or parallel to inner strip 51 of concentrating unit 39. Coil 71 may be made of copper tubing of, for example, one-eighth inch to one quarter inch diameter. An insulative material 73 such as, for example, fiberglass is disposed around the sides and the lower portion of the tubing for partially thermally insulating the coil 71, leaving an upper portion 75 of the tubing exposed to the lenses 43. A rigid backing strip 77 is disposed under the coil 71 for supporting the coil and the insulative material 73. Backing strip 77 is attached at its ends to backplate 45, as by cement. Backing strip 77 may be made of suitably rigid metal or plastic or other materials.

An input pipe 79 and an output pipe 81 extend through openings 80, 82, respectively, in backplate 45 and are connected to the ends of coil 71. Input pipe 79 and output pipe 81 may be extensions of the tubing forming coil 71, or they may be separate pipe joints coupled to the coil.

A heat transfer fluid, the flow of which is indicated by arrows 83, 85, is pumped by a pump 87 through input pipe 79 to coil 71, through coil 71 and then away from coil 71 through output pipe 81. It will be appreciated, however, that the direction of flow may be reversed if desired, whereupon pipe 81 would serve as the input pipe and pipe 79, the output pipe. The heat transfer fluid indicated by 83, 85 may be either a liquid or a gas. The unit from which the fluid is pumped to coil 71 and to which the fluid returns from the coil is indicated at 89. Unit 89 may be either a unit for immediate utilization of the heat transfer fluid, such as a heater or an air conditioner, or a unit for storing the fluid for subsequent utilization.

Flanges 57 of concentrating unit 39 are disposed upon the upper surface of backplate 45, unit 39 being supported thereby. Flanges 57 may be affixed to backplate 45, as by cement. Collecting unit 41 is also supported by backplate 45, input and output pipes 79, 81 being provided a tight fit in openings 80, 82 or otherwise being secured within said openings, as by cement.

Figure 2:
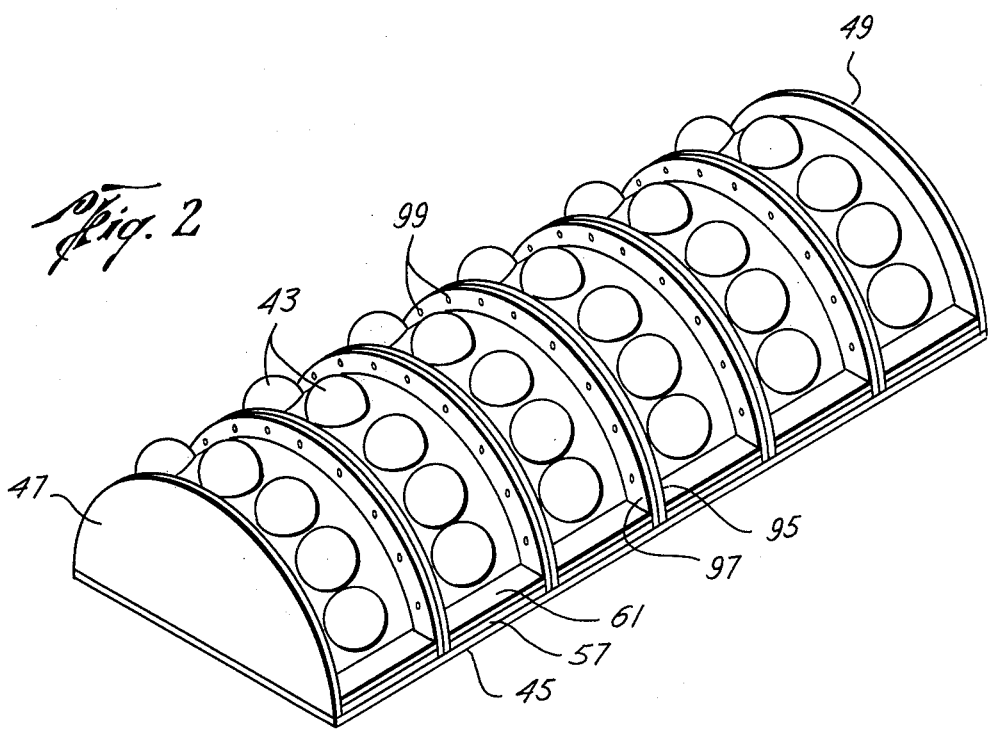
FIG. 2 is a pictorial view of a plurality of solar energy collectors of the preferred embodiment of the present invention interconnected for use, for example, on the roof of a building.

Semicircular side plates 47, 49 provide additional rigidity and support for the elements of the solar energy collector of FIG. 3. Plates 47, 49 are attached at their straight edges 91, 93 (FIG. 4) to backplate 45, as by cement. Plates 47, 49 extend perpendicularly upward from backplate 45 and are affixed to the sides of curved portion 55 of inner strip 51, curved section 59 of outer strip 53 and backing strip 77, as by cement. Plates 47, 49 extend upward from curved section 59 as at 95, 97 to provide flanges through which bolts 99 may be inserted for attaching a plurality of collectors together into a larger unit (FIG. 2).

Backplate 45 and side plates 47, 49 may be made of any suitably rigid material such as, for example, wood, plastic or metal. It is preferred to use a transparent thermoplastic such as that used for concentrating unit 39, e.g., Lucite acrylic.

The plastic strips 51, 53 of energy concentrating unit 39 may be manufactured quickly and inexpensively by a process known in the art as "blow-forming", wherein a strip or sheet of plastic such as Lucite acrylic is warmed to a softened state at a temperature of 300 plus or minus 30° F., is forced by air pressure into conformity with the inner surface of a rigid mold, and is then cooled and hardened. The mold for the outer strip 53 may have an inner semicylindrical surface portion conforming in shape with the main body section 59, a plurality of spherical recesses or depressions uniformly spaced along the semicylindrical portion conforming in shape with bubbles or bulges 63, and planar surfaces at the ends of the semicylindrical portion conforming in shape with flanged portions 61. The mold for the inner strip 51 may have an inner semicylindrical surface portion conforming in shape with central body portion 55, and planar surface portions at the ends of the semicylindrical portion conforming in shape with flanged portions 57. Another mold that may be used to form outer strip 53 is shown in FIG. 9 and has an inner semicylindrical surface portion 98 conforming in shape with body section 59, a plurality of round holes 100 uniformly spaced along the semicylindrical portion, and planar surfaces 102 at the ends of the semicylindrical portion. When a softened plastic strip or sheet is placed in a mold, air pressure is applied to the interior of the mold so as to force the plastic against the inner surface of the mold into conforming contact therewith. When a mold such as that shown in FIG. 9 is used, the plastic is forced into conformity with surfaces 98 and 102, and "pops" out through holes 100, thus forming bubbles 63. When the plastic is then cooled and hardened, it may be removed from the mold, retaining the shape of the inner surface of the mold.

The plastic strips 51, 53 are attached together, as by cement, at their ends at flanges 57, 61. A seal 101 of rubber or the like is disposed between the flanges extending the width of the flanges in grooves cut in the adjoining surfaces of the flanges. Seal 101 prevents leakage of liquid 67 from between the flanges.

Sealing strips 103 (FIG. 4) of rubber or the like are tightly wedged or sandwiched between the inner and outer plastic strips 51, 53 at the sides thereof to contain liquid 67 between the strips and to prevent leakage of liquid 67 from the sides of the plastic strips. When plastic strips 51, 53 are cemented together and seal 101 and sealing strips 103 are in place, a filling hole may be drilled in the outer strip 53 in the main body section 59 thereof through which liquid 67 may be injected to fill the space between the strips, including the chambers under the bubbles 63. When the liquid 67 has been injected so as to fill all the space between the strips, a rubber plug 105 is then wedged in the filling hole to seal the hole and prevent leakage of liquid 67 therefrom.

Lenses 43 may be of any size from, for example, ten inches to forty inches in diameter. For a typical home installation for heating or air conditioning purposes, five to seven lenses of from ten to twelve inches in diameter are preferred. A concentrating unit 39 of four feet in diameter will accommodate five of such lenses, and a unit 39 of six feet in diameter will accommodate seven of such lenses.

The lenses 43 are preferably meniscus-type converging spherical lenses, but other shapes of converging lenses may be used such as, for example, plano-convex or biconvex spherical lenses, or aspherical lenses. The shape of the lenses 43 depends, of course, on the shape of the mold used to blow-form the plastic strips or sheets 51, 53 which form the surfaces of the lenses. If the inner plastic strip 51 is formed with bubbles or bulges thereon protruding inwardly toward collecting unit 41 and corresponding to the bubbles 63 so that the two sets of bubbles may be aligned, then lenses 43 would be of the biconvex type. Alternatively, flat portions of sufficient size, e.g., squares with sides equal to the diameter of bubbles 63, may be provided on inner strips 51 in alignment with bubbles 63, thus forming plano-convex lenses. Other shapes of lenses may be obtained by further varying the shape of the blow-forming molds.

Moreover, several types of converging lenses may be formed by providing the inner plastic strip 51 with the bubbles 63 and providing the outer plastic strip 53 with appropriate curved surfaces in alignment with the bubbles on the inner strip. For example, by providing inner strip 51 with a plurality of bubbles bulging inward toward coil 71, plano-convex lenses may be formed by providing outer strip 53 with flat portions in alignment with the bubbles; meniscus convex lenses may be formed by providing outer strips 53 with curved surfaces in alignment with the bubbles and oriented toward coil 71; and biconvex lenses may be formed by providing outer strip 53 with curved surfaces in alignment with the bubbles and oriented away from coil 71.

Lenses 43 are disposed in concentrating unit 39 with their optical axes lying in a single plane. All the lenses 43 have the same focal length. Applicant has found that a plano-convex lens such as lens 11 shown in FIG. 1, made of acrylic plastic three sixteenths inches thick, filled with mineral oil and having a diameter of twelve inches and a depth of four inches, has a focal length of eight inches. Each of the lenses 43 is spaced from the coil 71 a distance equal to its focal length, so that all the foci of all the lenses 43 are on or near the coil 71.

The solar energy collector of FIG. 3 may be installed in any location providing exposure to the sun's rays, for example, on the roof of a house or other building, or on the ground. Preferably, such a location should be exposed to the sun's rays from dawn until dusk, because the greater the exposure time to the sun's rays, the more solar energy will be collected by the invention. The solar energy collector of FIG. 3 has its lenses disposed generally in a semicircular arc and will be, therefore, particularly effective when the collector is mounted with its backplate horizontally disposed with respect to the ground and in a location having maximum exposure time to the sun's rays. If a location having maximum exposure time cannot be found in the vicinity in which the invention is to be used, then it may be desirable to use a concentrating unit having less than a complete semicircular arc of lenses, the shape of the arc to be used corresponding to that portion of a complete arc that would be exposed to the sun's rays.

Operation of the preferred embodiment of the collector of the invention includes securing the collector in a fixed position such that lenses 43 are exposed to the sun during the day and such that the track of the sun will pass sequentially through, or near, each of the optical axes of the lenses 43, several of such optical axes being shown at B, C, D and E. For example, the collector can be mounted on the roof of a house with its backplate horizontally disposed and with the semicircular arc of lenses oriented in a generally east-west direction. In this position, optical axis D of the topmost lens will be vertical, and the optical axes B, E of the lowermost lenses on each side of the arc will be at a small angle, typically fifteen degrees or less, to the horizontal. Axis C of a lens adjacent the lowermost lens will be at an intermediate angle, such as forty degrees, to the horizontal, that is, greater than such small angle but less than ninety degrees, the value of such intermediate angle depending on the size and number of lenses used and the spacing between them.

The collector is set up for use by connecting coil 71 to a usage system 89, such as a domestic absorption type air conditioning system, a heating system or a storage tank, through pipes 79, 81 and pump 87. A heat transfer fluid, such as one of Monsanto Industrial Chemical Co.'s Therminols, or Dow Chemical Co.'s Dowtherm, is forced through coil 71 by pump 87. Such a heat transfer fluid may be, for example, an alkylated benzene. The particular fluid used will depend on the temperature ranges it will be subject to in operation. Therminol 66, for example, may be used where the operating temperatures range from 15° F. to 650° F., and Therminol 88 may be used for temperatures up to 750° F. Applicant has found that an installation such as shown in FIG. 1, using Nujol inside the lens, may reach a temperature of 600° F. inside the cup.

At dawn, the sun's rays will be directed in a generally horizontal direction toward one of the ends of the collector. Assuming for the purposes of this description that the easternmost lens is the one with axis B, the sun's rays will be at an angle of, for example, fifteen degrees to axis B. The sun's rays will generally be concentrated by this easternmost lens to one side of focal point $f_B$ in the focal plane of such lens and will impinge upon coil 71 near the portion 107 of the coil proximate the focal point $f_B$. This will cause the portion 107 of the coil to be warmed slightly. This in turn will cause the heat transfer fluid being forced through coil 71 by pump 87 to be warmed. The actual amount of warming will depend to a large extent on the optical characteristics of the lens, including its aperture.

At the same time, the sun's rays are at a larger angle, for example, forty degrees, to the adjacent lens, i.e., that lens having optical axis C, so that the rays are generally concentrated farther to one side of the corresponding focal point $f_C$ than is the case with the rays focused by the easternmost lens with respect to $f_B$. Consequently, the portion of the coil proximate $f_C$ will be warmed to a lesser extent than is coil portion 107, and the heat transfer fluid will in turn be warmed to a lesser incremental extent. Now, the sun's rays are at an increasingly larger angle to the axes of successive lenses so that the rays are concentrated at points increasingly farther from the respective focal points, resulting in diminishing warming of the coil, for example at coil portion 109, and hence the fluid, with respect to successive lenses.

Because axis D is essentially normal to the sun's rays at dawn and axis E actually extends away from the sun, very little, if any, warming of the coil and the fluid therewithin will be accomplished by the corresponding lenses, and those between such lenses, at this time.

At some point in time after dawn, the sun's rays will be positioned on or near axis B of the easternmost lens. At such time, the sun's rays will be focused at focal point $f_B$ by such lens. On a clear day, i.e., when the sun's rays are primarily direct as opposed to diffuse, the temperature at the focal point of a lens of the type described above may be approximately 600° F. when the sun is positioned on or near its optical axis. Thus, coil portion 107 is heated extensively at $f_B$, as is the heat transfer fluid within the coil. Furthermore, the sun's rays are at a smaller angle than at dawn to the adjacent and successive lenses, so that warming of the coil, and hence the fluid, by such adjacent and successive lenses is greater than at dawn. As a result, fluid flowing through coil 71 is heated extensively at $f_B$, and is heated further by the adjacent and successive lenses in successively decreasing amounts.

It will be appreciated that during the course of a day, the sun will be positioned on or near the axes of each lens successively, e.g., on axes C, D and E. At such times, the portions of the coil proximate the respective focal points of the lenses, and hence the fluid within the coil, will be warmed extensively. At the same time, the adjacent and successive lenses in both directions from the lens on whose axis the sun is positioned, i.e., in the direction of the sun's apparent movement and in the opposite direction, will concentrate the sun's rays to a lesser degree and will warm the coil, and the fluid, in successively diminishing incremental amounts.

Furthermore, even when the sun is positioned between and at an angle to the optical axes of two adjacent lenses, such as between axes B and C, the lenses corresponding to such axes will concentrate the sun's rays in the manner previously described with respect to rays arriving at an angle to an optical axis, and will warm the coil and fluid accordingly. In like manner, the lenses adjacent to such two lenses in both directions, and the lenses successive to them, will warm the coil and the fluid in successively smaller increments.

Thus, even though the collector has no moving parts, the sun's rays are collected continuously between sunrise and sunset. The actual amount of solar energy collected, of course, will vary during the course of a day depending on the position of the sun relative to the optical axes of the lenses, with the peak energy-collecting periods occurring during those times when the sun is positioned on or near one of the axes.

As described above, the axes of the lenses are in a common plane. If the axis D of the topmost lens is vertical, then this common plane is vertical. While such positioning will give best results for positions on the equator during an equinox, the results for other geographical locations at other times of the year may not be optimum. Therefore, it may be desirable to fix the position of the collector so that the average results are optimum over the course of a year.

In addition to collecting solar energy for use in air conditioning and heating systems, the collector shown in FIG. 3 may serve as a skylight in allowing a portion of the sun's rays to be transmitted through the collector and into the interior of the room or building on the roof of which it is installed. At both ends of the collector, there is a strip indicated at S between the coil 71 and the collector ends that is unobstructed by the coil when viewed from below, for example, from the interior of such a room or building. Thus, if a transparent material such as Lucite acrylic plastic is used for backplate 45, a portion of the sun's rays will pass through collecting unit 39 and backplate 45 at strips S and into the room or building. A translucent, non-transparent panel 111 may be disposed between the collector and the observer if desired, for example, as a part of the ceiling of the room, to allow light to pass into the room while partially masking the collector apparatus from view. For example, a decorative or colorful panel may be used for panel 111 to provide aesthetically pleasing results. Such a panel may instead be used for backplate 45 itself, thereby avoiding using both a backplate and a separate panel.

If energy usage demand is greater than the capacity of a single collector, then a plurality of collectors may be installed on the same roof and may be attached together, for example, as shown in FIG. 2, to increase the total amount of solar energy collected. If a plurality of collectors are used, the coils of the individual collectors may be connected in series so that the heat transfer fluid therein flows from one collector to the next, or the coils may be individually connected to a common source, such as a large storage tank, so the fluid flows from the common source, to one of the coils, and then back to the common source. As shown in FIG. 2, adjacent collectors are attached together by bolts 99 and nuts (not shown) inserted through holes in extensions 95, 97 of side plates 47, 49.

Although the collector described above and shown in FIGS. 3 and 4 is preferred, many variations in structure are possible.

For example, the lenses may be disposed with their axes in a plurality of planes rather than in a single plane as in the preferred embodiment. In such an alternative embodiment, the sun may be positioned on an optical axis of a lens even if the sun passes over the collector at an angle to such a single plane. As a result, substantial solar energy can be collected regardless of the season of the year.

Thus, the alternative embodiment of the invention shown in FIG. 5 is especially suited for multi-season use. In FIG. 5, there is shown a solar energy collector having a concentrating unit 113 and a collecting unit 115. Concentrating unit 113 comprises inner and outer transparent plastic domes 117, 119, respectively. Inner dome 117 is nested within and spaced apart from outer dome 119. The domes 117, 119 may be made from Lucite acrylic plastic. The domes 117, each have a body portion generally of hollow hemispherical configuration, and have outwardly extending circumferential flanges 121, 123, respectively, at their edges. The domes 117, 119 are attached together, as by cement, at the flanges 121, 123, the lower surface of flange 123 being cemented to the upper surface of flange 121. A circular seal 125 of rubber or other suitable material is sandwiched between flanges 121, 123 in opposing grooves cut in the flanges so as to provide a fluid-tight sealed connection between inner and outer domes 117, 119.

A circular disk or backing plate 127 is connected to the lower surface of flange 121, as by cement. Plate 127 is preferably made from transparent plastic, such as Lucite acrylic.

The body portion of outer dome 119 includes a plurality of hollow, outwardly protruding convex bulges or bubbles 129 uniformly disposed about its surface. Bubbles 129 are generally spherical in shape and are like previously described bubbles 63 shown in FIG. 3. The spherical portion of dome 119 between bubbles 129 is indicated at 131.

The space between the inner and outer domes 117, 119, including the space between portion 131 and the inner dome and the space between the bubbles 129 and the inner dome, is preferably filled with the transparent liquid 67. Liquid 67 may be injected between the domes through a hole drilled in the outer dome. A plug 231 of rubber or other suitable material is then wedged in the hole to seal it and prevent leakage of liquid 67 from the hole.

Inner and outer domes 117, 119 may be made by the blow-forming technique prevously described, using appropriately shaped molds having either a smooth inner surface in the case of inner dome 117, or a plurality of spherical depressions in an otherwise smooth inner surface in the case of outer dome 119.

The bubbles 129, liquid 67 thereunder and the respective adjacent surfaces of inner dome 117 comprise a plurality of meniscus-type convex lenses 133 like previously described lenses 43, shown in FIG. 3. Lenses 133 are all of the same focal length and are uniformly spaced from collecting unit 115 at a distance such that the focal point of each lens is on or near the collecting unit 115.

Collecting unit 115 comprises a double-walled dome 135 of metal or other thermally conductive material such as, for example, steel. Dome 135 is of generally hemispherical configuration and includes an inner wall 137 and an outer wall 139 spaced therefrom. An annular member 141 is disposed between the inner and outer walls adjacent to their edges and is connected to each wall, as by welding. A layer of thermally insulative material 142 is provided under inner dome wall 137.

An input pipe 143 and an output pipe 145 are inserted through holes in diametrically opposed sides of annular member 141 and placed in communication with the space between the inner and outer walls 137, 139. An O-ring seal 147 of rubber or the like is disposed in a groove in member 141 around each pipe to prevent fluid leakage from around the pipes.

In use, the collector is mounted so as to be exposed to the sun, as on a roof of a house. Since the lenses 133 are disposed with their optical axes directed from a spherical surface in a plurality of planes, the sun will be on or near one of the axes regardless of the position of the sun in the sky, whether summer or winter, spring or fall. The sun's rays will be concentrated by lenses 133 onto the outer surface of dome 135, which will be warmed thereby.

A heat transfer fluid 149 such as, for example, Therminol or Dowtherm, is forced by pump 87 through pipe 143 into the space between the dome walls. The fluid 149 circulates through the dome and collects the heat from the dome walls and then exits from the dome through output pipe 145, whereupon it flows to utilization system 89. In system 89, the solar energy collected by the fluid is either utilized immediately or stored for later use. Upon the solar energy being spent, the fluid 149 is pumped back to the dome 135 to collect more solar energy.

It will be noted that in the alternative embodiment of the invention shown in FIG. 5, the portion S' of the collector that is unobstructed by the dome 135 when viewed from below, thus serving as the skylight portion of the collector, will appear to an observer as an annular ring.

The collecting unit of the preferred embodiment of the invention may also be modified in various respects. Thus, in FIG. 6 there is shown a solar energy collector having a concentrating unit 39 of the preferred embodiment and a modified collecting unit 151. Modified collecting unit 151 includes an arched tube 153 of metal or other thermally conductive material, such as steel, surrounding the serpentine coil 71. The tube 153 has inserts 155 attached to the tube just inside of its ends, as by welding, for closing the tube. Inserts 155 have holes therein through which pipes 79, 81 extend for connection to coil 71. Seals 157 are provided around the pipes 79, 81 where they pass through the holes in inserts 155 to prevent fluid leakage from around the pipes. Thermally insulative material 158 is provided under the tube 153.

The tube 153 is filled with a heat transfer fluid 159, such as Therminol or Dowtherm, which may be injected into the tube through a hole in the tube, which is then plugged or sealed. Additional heat transfer fluid, such as Therminol or Dowtherm, is pumped through coil 71 by pump 87.

In operation, the lenses 43 concentrate the sun's rays onto tube 153, which is warmed thereby. The fluid within the tube and in contact therewith is warmed by conduction of heat from the walls of the tube to the fluid. This fluid then helps distribute the heat throughout the tube, and also to coil 71, by convection and conduction. Since the fluid is in surrounding relation to the coil 71, the heat is more uniformly imparted to coil 71 and, hence, to the additional fluid being pumped therewithin.

In another alternative embodiment of the invention, the double-walled dome 135 of the collecting unit shown in FIG. 5 may be replaced by a coil 161 of copper tubing similar to coil 71 and shown in FIG. 7, only convoluted to conform generally to hollow hemispherical configuration.

In another alternative embodiment of the invention, the arched coil 71 of FIG. 3 may be replaced by a plurality of flat, hollow plates 163 as shown in FIG. 8, connected together and forming an arch under the lenses. Preferably, an equal number of plates 163 as lenses are provided, each plate being aligned with and spaced from one of the lenses a distance equal to its focal length. A number of such plates 163 may be welded together into an arch, for example, or one large plate may be bent or crimped into the proper shape.

In another alternative embodiment of the invention, in place of a spherical or arched coil or a double-walled dome the collecting unit may include a flat coil or a single flat hollow plate horizontally disposed with respect to the concentrating unit. In this case it is still preferred that the foci of the lenses are all on or near the collecting unit, so lenses of different focal lengths should be used.

The above alternative embodiments are merely exemplary of the possible changes or variations that may be made.

Because many varying and different embodiments may be made within the scope of the inventive concept herein taught, and because many modifications may be made in the embodiments herein detailed, it should be understood that the details described herein are to be interpreted as illustrative and not in a limiting sense.

What is claimed as invention is:

1. A solar energy collector, comprising:
 concentrating means for concentrating solar radiation including a plurality of converging lenses each having a curved surface, an optical axis, a principal focus and a focal length, said concentrating means including a first member and a second member of transparent thermoplastic, said first and second members each having a body portion, said body portions being disposed in nested, spaced apart interrelationship, one of said body portions of said members having a plurality of spaced apart hollow spherical bubbles therein bulging away from the other of said body portions and forming said curved surfaces of said lenses, said bubbles being integral with and part of said one of said body portions of said members, the interior surface of each of said bubbles defining a chamber, each of said chambers being in communication with the space between said body portions of said members;

collecting means for collecting such solar radiation including a fluid-transporting heat transfer unit; and frame means connected to said concentrating means and said collecting means for fixing the position of each of said lenses relative to said heat transfer unit at a distance from said heat transfer unit substantially equal to said focal length so that said focus of each of said lenses is located proximate said heat transfer unit, wherein said solar energy collector is mounted on a building and is exposed to the sun's rays, said frame means including means for allowing some of the sun's rays to pass through said collector and into the interior of such building.

2. Collector according to claim 1, wherein said frame means includes means for substantially masking said collector from view from such interior of such building while allowing some of the sun's rays to pass through said masking means and into such interior of such building.

3. A solar energy collector, comprising:

concentrating means for concentrating solar radiation including a plurality of converging lenses each having a curved surface, an optical axis, a principal focus and a focal length, said concentrating means including a first member and a second member of transparent thermoplastic, said first and second members each having a body portion, said body portions being disposed in nested, spaced apart interrelationship, one of said body portions of said members having a plurality of spaced apart hollow spherical bubbles therein bulging away from the other of said body portions and forming said curved surfaces of said lenses, said bubbles being integral with and part of said one of said body portions of said members, the interior surface of each of said bubbles defining a chamber, each of said chambers being in communication with the space between said body portions of said members;

collecting means for collecting such solar radiation including a fluid-transporting heat transfer unit; and frame means connected to said concentrating means and said collecting means for fixing the position of each of said lenses relative to said heat transfer unit at a distance from said heat transfer unit substantially equal to its focal length so that said focus of each of said lenses is located proximate said heat transfer unit, wherein said first and second members each include a peripheral portion connected to and extending from said body portion for interconnecting said first and second members.

4. Collector according to claim 3, said first and second members being an inner and an outer curved elongate strip, respectively, said bubbles forming said curved surfaces of said lenses being circumferentially spaced apart on said body portion of said outer strip, said inner strip body portion and said outer strip body portion exclusive of said bubbles being parallel and conforming generally to the shapes of hollow, right circular semicylinders, said inner strip body portion being nested within said outer strip body portion.

5. Collector according to claim 4, wherein said peripheral portions of said strips include an outwardly extending flange on each end of each of said strips, said flanges each having an upper and a lower face, said flanges on said outer strip being connected to said flanges on said inner strip at the respective ends of said strips with such lower faces of said flanges on said outer strip adjoining such upper faces of said flanges on said inner strip.

6. Collector according to claim 5, wherein said concentrating means includes means connected to said inner and outer strips for enclosing the space therebetween, said enclosing means including:

a rubber seal disposed between said connected flanges at each end of said strips in opposing grooves cut in such adjoining faces, said seals extending the entire width of said strips; and rubber sealing strips sandwiched between said inner and outer thermoplastic strips adjacent their sides and flush with their side edges.

7. Collector according to claim 6, wherein said frame means includes:

a rigid, elongate, rectangular flat backplate connected to such lower faces of said flanges on said inner strip and supporting said inner and outer strips; and a pair of rigid, flat semicircular side plates disposed perpendicular to said backplate and attached thereto at their diametric edges, one side plate being disposed at each side of said inner and outer strips, said side plates extending higher from said backplate than said inner and outer strips, said side plates being attached to such side edges of said inner and outer strips;

said side plates having a plurality of holes therein adjacent their semicircular edges for receiving connectors for use in attaching said collector to another solar energy collector.

8. Collector according to claim 4, wherein said lenses all have the same focal length and said heat transfer unit includes a serpentine coil of tubing disposed under and spaced from said inner strip body portion and parallel thereto, said coil being spaced from said lenses a distance substantially equal to said focal length of said lenses.

* * * * *

UNITED STATES PATENT AND TRADEMARK OFFICE
CERTIFICATE OF CORRECTION

PATENT NO. : 4,305,383
DATED : DECEMBER 15, 1981
INVENTOR(S) : DAN E. BLOXSOM

It is certified that error appears in the above—identified patent and that said Letters Patent is hereby corrected as shown below:

Column 4, line 17; change "intermediate" to --immediate--.

Column 4, line 31; change "is" to --in--.

Column 10, line 47; after "117," insert --119--.

Column 11, line 11; change "prevously" to --previously--.

Signed and Sealed this

Twenty-third Day of March 1982

[SEAL]

Attest:

Attesting Officer

GERALD J. MOSSINGHOFF

Commissioner of Patents and Trademarks